United States Patent [19]

Lemmin

[11] Patent Number: 4,719,750
[45] Date of Patent: Jan. 19, 1988

[54] INSTALLATION FOR THE CONTROL OF THE FUEL SUPPLY TO THE AFTERBURNER OF A BYPASS GAS TURBINE JET PROPULSION UNIT

[75] Inventor: Juergen Lemmin, Lochham, Fed. Rep. of Germany

[73] Assignee: MTU Munchen GmbH, Munich, Fed. Rep. of Germany

[21] Appl. No.: 940,419

[22] Filed: Dec. 11, 1986

[30] Foreign Application Priority Data

Dec. 12, 1985 [DE] Fed. Rep. of Germany ....... 3543908

[51] Int. Cl.$^4$ .............................. F02C 3/10; F02C 3/11
[52] U.S. Cl. ...................................... 60/226.1; 60/243; 60/261
[58] Field of Search ...................... 60/226.1, 235, 243, 60/261, 39, 281

[56] References Cited

U.S. PATENT DOCUMENTS

| 2,847,821 | 8/1958 | Brown | 60/261 |
| 2,887,845 | 5/1959 | Hagen | 60/261 |
| 3,041,826 | 7/1962 | Coan | 60/261 |
| 3,834,160 | 9/1974 | Moehring | 60/243 |
| 3,857,241 | 12/1974 | Lewis | 60/261 |

OTHER PUBLICATIONS

Agard Papers Presented at 44th Meeting of the Agard Propulsion and Energetics Panel held at Høyfjellshotell, Ustaoset, Norway, Sep. 9–13, 1974.

Primary Examiner—Louis J. Casaregola
Attorney, Agent, or Firm—Barnes & Thornburg

[57] ABSTRACT

An installation for the control of the fuel supply to the afterburner of a bypass jet propulsion unit which permits an individual modulation of the fuel flows to the different burner systems, namely, the ignition burner, the main burner in the inner flow and the burner in the bypass flow. For this purpose, separate fuel pumps are coordinated to the inner flow and the bypass flow. The two fuel systems of the inner flow are thereby so linked from a shifting and regulating point of view that they can be individually modulated without mutual reaction. The fuel system of the bypass flow is independent of the fuel system of the inner flow so that the modulation thereof also has no reaction on the fuel system of the inner flow. The installation additionally enables a rapid prefilling of the injection lines in that the injection lines of the ignition burner are prefilled by way of the metering device for the entire fuel quantity of the inner flow and the injection lines of the main burner in the inner flow are prefilled by way of the metering device for the fuel of the bypass flow.

18 Claims, 1 Drawing Figure

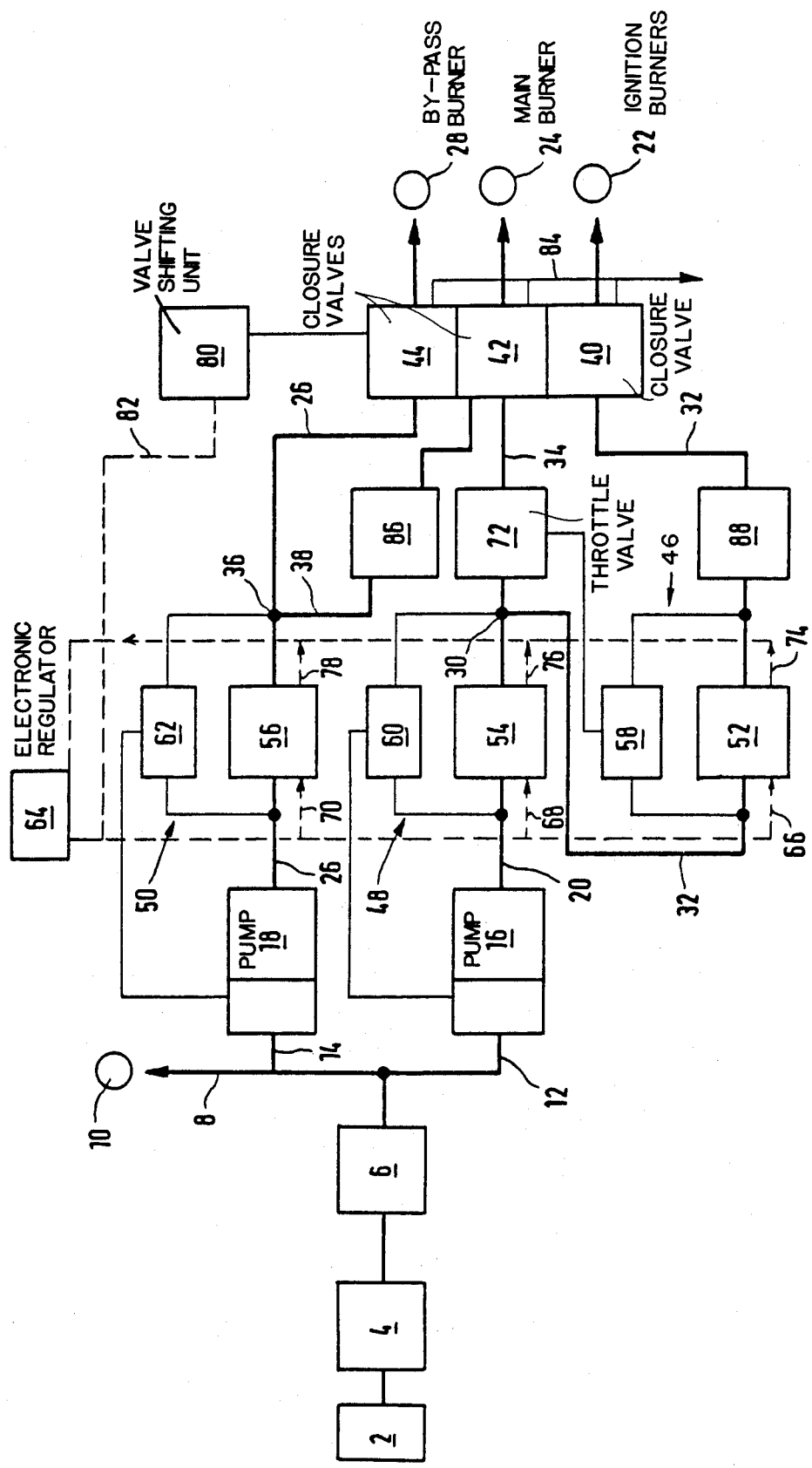

INSTALLATION FOR THE CONTROL OF THE FUEL SUPPLY TO THE AFTERBURNER OF A BYPASS GAS TURBINE JET PROPULSION UNIT

The present invention relates to an installation for controlling the fuel supply to the afterburner of a bypass gas turbine jet propulsion unit which includes a fuel pump arrangement and a fuel line adjoining the pump arrangement and leading to the burners of the inner flow, which splits off into one fuel line each to the mainer burner of the inner flow and to the ignition burner of the inner flow, as well as a fuel line to the burner of the by-pass flow.

The afterburning in by-pass jet propulsion units poses particular problems in that two air flows with considerably different temperature have to be afterburned. In addition to older methods in which the hot air of the inner flow and the colder air of the by-pass flow are initially mixed and the fuel was injected into the mixed air by way of a burner system arranged at the end of the mixing path, it is also known already to feed fuel separately to the inner flow and the by-pass flow by way of respective separate burners. Compared to the older system, an improvement of the afterburning efficiency as well as a reduction of the propulsion unit weight and the propulsion unit length could be achieved therewith.

An installation of the aforementioned type is already known in which the afterburner fuel is fed by a pump into a fuel line to the burners of the inner flow and into a fuel line to the burners of the by-pass flow, whereby a fuel line to the ignition burners branches off from the former fuel line (see "Afterburner Regulation Concepts", especially page 16.10 and page 16.11 as well as FIG. 6-3; K. Robinson. Dowty Fuel Systems Ltd., AGARD PAPER NO. . . . ). Metering devices are arranged in all three fuel lines by means of which respectively different fuel quantities are metered to the ignition burners, the main burners of the inner flow and the burners of the by-pass flow. The metering devices are synchronously adjusted by a control device so that also an afterburner thrust modulation is possible. By reason of the synchronous adjustment of all metering devices, the afterburner can be optimally designed essentially only for a predetermined operating point, for example, for the maximum thrust; in all other operating points, for example, at a partial load operation of the afterburner required at present to an ever greater extent also as operational possibility, the efficiency drops off strongly. A certain improvement of the efficiency at partial load operation was achieved, on the one hand, in that portions of the burners were turned off and the residual fuel could be better prepared as a result thereof and, on the other, in that the fuel metering at afterburner partial load was improved by the introduction of additional metering parameters.

With the known installation the injection lines of all burners must be preliminarily filled already, when turning on the afterburner and must alsio be held preliminarily filled with the respectively non-active burners; however, as relatively large fuel quantities have to be supplied during the preliminary or pre-filling in a short period of time, a preliminary or pre-filling of burner systems to be newly added would not be possible without harmful reaction on the already active burners by reason of the sudden pressure drop in the fuel lines. For that reason, the injection lines of individual burners to be turned off can be blown out or discharged only when the entire afterburner is turned off. This leads to poor combustion efficiencies in the afterburner partial load operation. A further disadvantage of the known installation results from the fact that the pre-filling of the injection lines of all burner systems must take place at the same time prior to the ignition of the afterburner which has as a consequence a relatively long reaction period, that is, the period of time between the turning on of the afterburner by the pilot up to the actual ignition.

It is the object of the present invention to provide an installation of the aforementioned type, which enables with small structural expenditure an optimization of the afterburner efficiency at any desired afterburner operating point between maximum and minimum afterburning, which exhibits good combustion efficiency in the afterburner partial load operation and which possesses short reaction periods.

The underlying problems are solved according to the present invention in that a first fuel pump is provided for the supply of the fuel line to the burners of the inner flow and a second fuel pump is provided for the supply of the fuel line to the burner of the by-pass flow whose feed quantities can be regulated independently of one another, in that a throttle valve is arranged in the fuel line to the main burner of the inner flow controllable by the fuel-metering device in the fuel line to the ignition burner, and in that a pre-filling line terminating in the fuel line to the main burner of the inner flow leads from the fuel line to the burner of the bypass flow, in which a pre-filling shifting valve is arranged for the selective connection of the prefill line with the fuel line to the burner of the bypass flow.

It can be demonstrated that an optimization of the afterburner efficiency is possible at any desired afterburner operating point between maximum and minimum afterburning if the individual burner systems can be regulated individually, that is, completely independently of one another. One can thereby start with the assumption that when turning on the afterburner and accelerating up to full load, at first the ignition burner, thereafter the main burner in the inner flow and last the burner in the by-pass flow is always turned on one after the other. The terms "main burner", "burner in the afterburner" and "ignition burner" are to be understood herein as referring to several individual burners of the same function which are distributed in appropriate form over the cross-sectional area of the afterburner inlet. For achieving good combustion efficiencies and short reaction periods of time, a pre-filling of the injection lines of individual burner systems is to take place only when the same are to be turned on whereby reactions on the respective, already active burner systems, for example, a brief reduction of the fuel supply to these systems cannot be permitted. The turning off of the afterburner takes place in reverse sequence, i.e., in that at first the burner in the by-pass flow, then the main burner in the inner flow and last the ignition burner is turned off. During the afterburner operation, the individual, respective active burner systems are to be adapted to be modulated independently of one another according to metering laws of their own which, for example, also includes the possibility to increase the fuel supply to one or two burner systems and at the same time to reduce the fuel supply to the remaining burner system or systems. In certain operating ranges of the afterburner, an optimal efficiency is then achieved if either the ignition burner alone or the latter together with the main burner in the inner flow is operated so that also these operations are to be possible.

It has been found that completely separate feed and control systems for each individual burner system have to be generally ruled out because of the high structural weight and the large requisite installation space. According to the present invention, two fuel pumps are used of which the first supplies the fuel line to the burners of the inner flow, to which belong also the ignition burners, whereas the second fuel pump supplies the fuel line to the burner of the by-pass flow. The two fuel pumps are so linked from a switching and regulating point of view that the requirements described hereinabove are fulfilled. For that purpose, a controllable throttle valve is arranged in the fuel line to the main burner of the inner flow which regulates the partial flow branched off to the ignition burners so that a separate fuel pump for the ignition burner can be dispensed with. The fuel quantity supplied to the main burner of the inner flow results from the difference of the total quantity supplied by the first fuel pump and the fuel quantity branched off to the ignition burner so that the main burner in the inner flow is regulatable essentially by a change of the feed quantity of the first fuel pump. The fuel feed system for the burner in the bypass flow is far-reachingly independent of those of the two other burner systems so that it can be modulated without reaction or repercussion on the same.

The pre-filling of the injection lines of the ignition burner takes place by the first fuel pump while the injection lines to the main burner in the inner flow are still disconnected. As the first fuel pump is designed for the supply of both burners of the inner flow, the pre-filling time period and therewith the reaction time of the afterburner up to the first ignition is very brief. The injection lines of the main burner in the inner flow can be pre-filled far-reachingly simultaneously by the second fuel pump by way of the prefilling line and the prefilling shifting valve while the injection lines to the burner of the bypass flow are still closed off so that also this pre-filling operation takes place in a very short period of time and thus has no reaction or repercussion on the metering of the fuel flow to the ignition burner. After the prefilling of the injections line to the main burner in the inner flow the prefilling shifting valve is closed so that the entire fuel flow supplied by the first fuel pump is available for filling the injecion lines for the burner of the bypass flow so that also this burner can be pre-filled in shortest period of time.

All further requirements described hereinabove can be fulfilled with the aid of the installation according to the present invention as will be described more fully hereinafter.

The control of the fuel-metering devices takes place according to the present invention by an electronic control unit according to fixed metering laws. The control may also take place by the electronic control unit which may be of any conventional construction.

The fuel metering devices are constructed according to one embodiment of the present invention as metering valves whose through-flow cross section is predetermined by the control unit and whose pressure drop is regulated by way of respectively coordinated pressure drop regulators; the pressure drop regulator of the metering valve arranged in the common line to the burners of the inner flow thereby regulates the feed quantity of the first fuel pump, the pressure regulator of the metering valve for the ignition burner adjusts the throttle valve and the pressure regulator of the metering valve for the burner of the bypass flow regulates the feed output of the second fuel pump.

According to a further feature of the present invention, provision is made that closure valves are arranged in the fuel lines to the main burner of the inner flow, to the ignition burner and to the burner of the bypass flow which are arranged ahead of these burners and are individually controllable by the electronic control unit. The closure valves thereby permit to individually turn on or off the individual burner systems depending on predetermination by the control unit. According to a still further feature of the present invention, a blow-out or discharge valve may be coordinated thereby to each closure valve, through which the fuel lines are adapted to be connected downstream of a respective closure valve with a blow-out or discharge device after the closing of the closure valves. The blowing-out of the injection lines of the respectively not-needed burner systems contributes considerably to the improvement of the combustion efficiency at partial load operation, whereby at any time, as needed, a renewed prefilling of these injection lines is possible in the manner described hereinabove.

If the burner systems are to be turned on or off each in its entirety, the closure valves can be constructed according to the present invention as open/closed valves. If, by contrast, individual burner systems, for example, the main burner in the inner flow and/or the burner in the bypass flow consist of individual nozzle groups to be turned on or off sequentially, then correspondingly constructed sequence valves will be used as closure valves.

According to still a further feature of the present invention, provision is made that a pressure build-up valve is arranged in the fuel line to the ignition burner downstream of the metering valve. This pressure build-up valve has the purpose to maintain a predetermined fuel pressure also with a small through-flow of the fuel in order to be able to carry out, for example, servo tasks realized by the fuel itself.

These and other objects, features and advantages of the present invention will become more apparent from the following description when taken in connection with the accompanying drawing which shows, for purposes of illustration only, one embodiment in accordance with the present invention, and wherein:

The single FIGURE is a block diagram of an installation for controlling the fuel supply to the afterburner of a by-pass jet propulsion unit with three separate burner systems in accordance with the present invention.

Referring now to the single FIGURE of the drawing, fuel is conducted from the fuel system 2 on the aircraft side to the fuel system 4 on the propulsion unit side. From there, it is brought by a pilot pump 6 to a pressure level which assures a cavitation-free operation of the high pressure pumps arranged downstream thereof for the main propulsion unit as well as for the afterburner. The fuel is conducted from the pilot pump 6 by way of a fuel line 8 to the high pressure pump 10 in the fuel system of the main propulsion unit. The installation described so far is known and forms no part of the present invention.

Additionally, fuel is conducted from the pilot pump 6 by way of fuel lines 12 and 14 to the two high presswure fuel pumps 16 and 18 in the fuel system of the afterburner.

The first fuel pump 16 supplies a fuel line 20 which leads to the burners arranged in the inner flow of the jet propulsion unit, namely, to the ignition burner 22 and to the main burner 24 in the inner flow. The second fuel pump 18 supplies a fuel line 26 which leads to the burner 28 in the by-pass flow.

The fuel line 20 divides in point 30 into a fuel line 32 to the ignition burner 22 as well as into a fuel line 34 to the main burner 24 in the inner flow. A pre-fill line 38 branches off in point 36 from the fuel line 26 to the burner 28 in the bypass flow, which terminates in the fuel line 34. It serves for pre-filling the fuel line 34, respectively, of the injection lines of the main burner 24 operatively connected with the same.

One closure valve 40, 42, and 44 each is arranged in the fuel lines 32, 34 and 26, respectively, which serve for closing off these fuel lines when turning off or shutting down the associated burner systems. As shown in the FIGURE, the connection of the pre-fill line 38 with the fuel line 34 may be integrated in the closure valve 42.

Fuel metering devices generally designated by reference numerals 46, 48 and 50 are arranged in the fuel lines 32, 34 and 26 which regulate respectively the fuel supply to the ignition burner 22, to the main burner 24 in the inner flow as well as to the burner 28 in the bypass flow. The fuel-metering devices 46, 48 and 50 are constructed essentially identically and include each a metering valve 52, 54 and 56 and a pressure drop regulator 58, 60 and 62 coordinated to the metering valve. The metering valves 52, 54 and 56 are controlled from the electronic control unit 64 corresponding to predetermined metering laws by way of associated signal lines 66, 68 and 70 indicated in dash lines. The metering cross section of the metering valves is adjusted by the desired values inputted into these signal lines; the pressure drop in the metering valve is monitored by the pressure drop regulator and is kept at a certain predetermined value by variation of the fuel quantity supplied or fed to the metering valve.

The pressure drop in the fuel-metering device 46 is regulated by adjusting a throttle valve 72 arranged in the fuel line 34 downstream of the branching point 30; the throttle valve 72 is connected with the pressure drop regulator 58, as will be described more fully hereinafter. The pressure drop in the fuel-metering device 48 is regulated by changing the feed quantity of the fuel pump 16 which is operatively connected with the pressure drop regulator 60. The pressure drop in the fuel-metering device 50 is regulated by changing the feed output of the fuel pump 18 which is connected with the pressure drop regulator 62. The positions of the metering valves 52, 54 and 56 are each fed back to the control unit 64 by way of signal lines 74, 76 and 78 also shown in dash lines.

The closure valves 40, 42 and 44 are actuated by an electro-mechanical valve-shifting unit 80 which is controlled by the control unit 64 by way of a signal line 82. Blow-out valves which may be integrated into the closure valves 40, 42 and 44, are also controlled by the valve-shifting unit 80 and enable a blowing-out or discharging of the injection lines of the different burner systems by way of the discharge or blow-out line 84.

A pre-fill shifting valve 86 is arranged in the pre-fill line 38 by means of which the pre-fill line 38 can be opened or closed.

A pressure build-up valve 88 is arranged in the fuel line 32 which assures a sufficient fuel pressure also at slight fuel through-flow through the fuel line 32 which is necessary for carrying out servo tasks by the fuel.

OPERATION

The operation of the installation in accordance with the present invention is as follows:

If one starts initially from a stationary operation with minimal afterburning, then the closure valve 40 is opened, the closure 42 and the closure valve 44 are closed.

Both the metering valve 52 as also the metering valve 54 are being controlled by the electronic control unit 64 by way of the lines 66 and 68. The pressure drop regulator 60 keeps the pressure drop across the metering valve 54 constant in that it varies the feed quantity of the fuel pump 16. If fuel is to be fed only to the ignition burner 22, the throttle valve 72 is kept in its closed position by the pressure drop regulator 58. In this operating condition, the metering valve 54 controls the fuel flow in the fuel line 32.

If, for increasing the afterburner thrust the additional turning-on or engagement of the main burner 24 is required, then at first the closure valve 42 is opened. The entire fuel flow supplied for the ignition burner 22 and the main burner 24 is metered by the metering valve 54 in dependence on a desired signal predetermined by the control unit 64 by way of the signal lines 68; the portion of the fuel flow, branched off to the ignition burner 22 is metered by the metering valve 52 in dependence on the desired signal predetermined by way of the signal line 66.

The pressure drop regulator 60 keeps the pressure drop across the metering valve 54 constant in that it varies the feed quantity of the fuel pump 16.

The pressure drop regulator 58 keeps the pressure drop across the metering valve 52 constant in that it controls the adjustment of the throttle valve 72. A change of the pressure in the line between the throttle valve 72 and the metering valve 54 results therefrom which is corrected by way of the pressure drop regulator 60 by a correspoding correction of the feed quantity of the pump 16. The fuel quantity fed the fuel line 34 results, as before, as a function of the position of the metering valve 54 and the regulated pressure drop.

If, for example, the fuel flow to the ignition burner is to be increased, then at first the metering cross section in the metering valve 52 is enlarged; the pressure drop regulator 58 equalizes the resulting pressure drop by a reduction of the throttle cross section in the throttle valve 72. The position of the metering valve 54 for the overall fuel to the inner flow remains unchanged.

The reduction of the throttle cross section has, as a consequence, as reduction of the pressure drop across the metering valve 54 which is compensated for by the pressure drop regulator 60 in that the feed quantity of the pump 16 is increased. The metered fuel to the main burner 24 is thus kept constant independently of a modulation of the fuel to the ignition burner.

In order to increase now the fuel quantity to the main burner 24, without thereby changing the fuel quantity to the ignition burner 22, at first the metering cross section of the metering valve 54 is increased and the reduced pressure drop resulting therefrom is compensated for by the pressure drop regulator 60 by an increase of the feed quantity of the fuel pump 16. At first, an increase of the pressure drop across the metering valve 52 again results therefrom. The same is corrected in that the pressure drop regulator 58 changes the position of the throttle valve 72 for such length of time until the pressure drop across the metering valve 52 again has the correct value.

In this manner, both an opposite change of the fuel flows to the burners 22 and 24 as also a change in the same sense with the same or different rate of change is therefore possible in that the overall fuel flow is adjusted in each case by way of the metering valve 54 and the desired distribution to the fuel lines 32 and 34 is adjusted by way of the metering valve 52.

The regulation of the fuel flow to the burner 28 in the bypass flow is completely independent of the metering of the fuel to the inner flow. If the metering cross section of the metering valve 56 is changed in dependence on a desired signal inputted by way of the signal lines 70, then the resulting change of the pressure drop across the metering valve 56 is compensated for in each case by a change of the output quantity of the fuel pump 18 in each case.

The turning-on or engagement of the afterburner and acceleration up to full load takes place always in the manner that at first the ignition burner 22, then the main burner 24 in the inner flow and finally the burner 28 in the bypass flow are turned on. Prior to turning on the burner system, the coordinated injection lines must be preliminarily or prefilled as rapidly as possible. Thereafter, the metering cross sections in the metering valves predetermined by the electronic control unit on the basis of the operating point preselected by the pilot has to be adjusted in the shortest possible time.

Starting condition is the operation of the main propulsion unit without any afterburning. If now the afterburner is selected by the pilot, then at first the metering valve 54 is fully opened corresponding to a desired signal inputted by way of the signal lines 68; in parallel thereto, the metering valve 52 is adjusted to the prefill position corresponding to a desired signal inputted by way of the signal lines 66 which opens up a valve cross section that lies outside of the normal modulation range of the metering valve 52 and is utilized only for prefilling. Additionally, the closure valve 40 is opened and, in case so provided, the otionally integrated blow-out valve is closed.

During the opening of the metering valve 54, the fuel pump 16 is brought into afterburner operating condition. The pressure drop regulator 60 brings about that the fuel pump 16 is accelerated to high output quantities and the desired prefilling of the injection system of the ignition burner is carried out thereby. After a period of time predetermined by the control unit 64, the metering valves 52 and 54 are so adjusted that the requisite fuel is metered to the ignition burner 22. The feed quantity of the fuel pump 16 is thereby so adjusted corresponding to the reduction of the metering cross section in the metering valve 54 by the pressure drop regulator 60 that the desired pressure drop across the metering valve 54 will establish itself. The metering valve 52 is also so positioned that the fuel required for the ignition burner 22 is metered. As long as fuel is supplied only to the ignition burner 22, the throttle valve 72 is displaced into the closed position by the pressure drop regulator 58 and is kept in such position.

In order to turn on also the main burner 24 in the inner flow, the metering valve 56 is adjusted to prefill position and therewith the fuel pump 18 is brought into operating condition. The closure valve 42 for the fuel to the main burner 24 in the inner flow is opened and, to the extent present, the optionally integrated blow-out valve is closed.

The prefill shifting valve 86 is opened so that the injection lines to the main burner 24 in the inner flow can be prefilled with the full output of the fuel pump 18 by way of the metering device 50 for the fuel of the bypass flow.

In case the burner 28 in the bypass flow is not to be activated immediately thereafter, the metering valve 56 is closed after completion of the prefill time and therewith the fuel pump 18 is decelerated by way of the pressure drop regulator 62. The prefill shifting valve 86 thereby closes automatically. The required fuel is metered to the ignition burner 22 and to the main burner 24 in the inner flow by a positioning of the metering valve 54 and of the throttle valve 72 in dependence on the inputs of the control unit 64.

If the burner system in the bypass flow is additionally to be turned on, then at first the metering valve 56 is brought into the prefill position, and the fuel pump 18 into operating readiness and accelerated to the prefill output by way of the pressure drop regulator 62. At the same time, the closure valve 44 is opened and, if present, the optionally integrated blow-out valve is closed. After termination of the prefill time, the metering valve 56 is brought into operating position in dependence on the desired signal inputted by way of the signal line 70 and the feed quantity of the fuel pump 18 is so adjusted by way of the pressure drop regulator 62 that the pressure drop across the metering valve 56 reaches a desired value.

The above-described engagement operations of the three metering systems are carried out overlappingly if the pilot preselects immediately the maximum afterburning from the normal operation of the main propulsion unit. The sequence controlled by the electronic control unit is then as follows:

The prefill operations for the injection lines of the ignition burner 22 and of the main burner 24 proceed directly one after the other or overlappingly. The prefill operation for the injection lines of the burner 28 follow immediately in that the metering valve 56 and the fuel pump 18 after prefilling of the injection lines for the main burner 24, are held in the prefill position, respectively, prefill output and the prefill shifting valve 86 is closed automatically during the opening of the closure valve 44, respectively, as a result of a corresponding signal from the control unit 64. In this manner, the time from turning on the afterburner by the pilot up to the ignition and the time for the acceleration of the afterburner to maximum afterburning can take place in a very short period of time.

It would be possible on the basis of the concept of the overall system to produce any desired turn-off sequence of the three burner systems by way of the electronic control unit 64. However, it can be demonstrated that under the aspect of the optimum afterburning efficiency, the turn-off sequence should proceed in reverse order to the turn-on sequence as already explained hereinabove. The individual steps of the turn-off or shutdown sequence thereby must not follow directly one after the other, instead, for example, after turning off the burner 28 in the bypass flow, an afterburner operation with any desired modulated fuel flows to the two burner systems of the inner flow can be maintained; similarly, after turning off the main burner 24 in the inner flow, an afterburner operation by means of the ignition burner alone can be carried out.

The turning off of the fuel to the burners 28 takes place by the closing of the metering valve 56 and by the changing of the fuel pump resulting therefrom into a configuration which corresponds to the turned-off condition of the burner 28. At the same time, the closure valve 44 is closed by the regulator 24 by way of the valve-shifting unit 80 and the optionally integrated blow-out valve is possibly opened.

For turning off the main burner 24 in the inner flow, the metering valves 54 and 52 are so adjusted by way of the control unit 64 that the fuel still required for the operation of the ignition burner is metered. At the same time, the closure valve 42 is closed and possibly the optionally integrated blow-out valve is opened. As already described hereinabove, the metering valve 54 takes over in this operating condition the metering of the fuel to the ignition burner 22. For turning off the ignition burner, the metering valves 52 and 54 are closed by way of the control unit 64, and the fuel pump 16 is adjusted into the configuration which corresponds to the turned-off burners 22 and 24. At the same time, also the closure valve 40 is closed and possibly the blow-out valve optionally integrated therewith is opened.

It can be readily seen that owing to the individual modulating ability of the fuel flows to the different burner systems corresponding to individual metering laws predetermined by the control unit, an optimal afterburning efficiency can be achieved at any desired afterburner partial load or afterburner full load operating point of the propulsion unit. The metering laws stored in the electronic control unit 64 are to be defined for the respective propulsion unit, the respective afterburner and the required after-burner operating range of an aircraft and are to be optimized so that the optimum afterburning efficiency is achieved. These metering laws which may be of any known type and form no part of the present invention, are therefore not described in detail thereof.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for controlling the fuel supply to an afterburner of a bypass gas turbine jet propulsion unit, comprising a fuel pump arrangement, fuel line means operatively connecting said fuel pump arrangement with burner means including ignition burner means and main burner means of the inner flow as well as burner means of the by-pass flow, the fuel line means to the burner means of the inner flow splitting off into a fuel line means to the main burner means and into a fuel line means to the ignition burner means, and controllable fuel-metering means arranged in the fuel line means to the main burner means of the inner flow, to the ignition burner means and to the burner means of the bypass flow, said pump arrangement including a first fuel pump means for feeding fuel to the fuel line means leading to the burner means of the inner flow and a second fuel pump means for feeding fuel to the fuel line means leading to the burner means of the bypass flow, the feed quantities of said first and second pump means being regulatable independently of one another, throttle valve means in the fuel line means to the main burner means of the inner flow which is controllable by the fuel-metering means in the fuel line means to the ignition burner means, and pre-fill line means operatively connecting the fuel line means to the burner means of the bypass flow with the fuel line means to the main burner means of the inner flow, said pre-fill line means including pre-fill shifting valve means for the selective connection of the prefill line means with the fuel line means to the burner means of the bypass flow.

2. An installation according to claim 1, further comprising an electronic control means for the individual control of the fuel metering means.

3. An installation according to claim 2, wherein the fuel-metering means are constructed as metering valve means whose through-flow cross section is predetermined by the electronic control means and whose pressure drop is regulated by way of respectively coordinated pressure drop regulator means, the pressure regulator means of the metering valve means in the fuel line means to the burner means of the inner flow controlling the feed output of the first fuel pump means, the pressure-regulator means of the metering valve means in the fuel line means to the ignition burner means controlling the thrrough-flow cross section of the throttle valve means in the fuel line means to the main burner means of the inner flow and the pressure regulator means of the metering valve means in the fuel line means to the burner means of the bypass flow controlling the feed output of the second fuel pump means.

4. An installation according to claim 3, wherein closure valve means are arranged in the fuel line means to the main burner means of the inner flow, to the ignition burner means and to the burner means of the bypass flow upstream of the respective burner means and individually controllable by the electronic control means.

5. An installation according to claim 4, wherein a blow-out valve is coordinated to each of the closure valve means through which the sections of the fuel line means leading to the burner meand downstream of the respective closure valve means are adapted to be individually connected with a blow-out device after closing of the closure valve means.

6. An installation according to claim 5, wherein the closure valve means are constructed as open/closed valves.

7. An installation according to claim 5, wherein at least one of the closure valve means in the fuel line means to the main burner means of the inner flow and the closure valve means in the fuel line means to the burner means of the bypass flow is constructed as sequence valve means for the sequential turning on or turning off of individual burner nozzle groups of the coordinated burner means.

8. An installation according to claim 5, wherein a pressure build-up valve is arranged in the fuel line means to the ignition burner means downstream of the metering valve means thereof.

9. An installation according to claim 5, wherein the prefill shifting valve means is actuated fuel-hydraulically in dependence on system internal pressures and is operable to be hydraulically locked in the closed position.

10. An installation according to claim 5, wherein the prefill shifting valve means is controlled by the electronic control means.

11. An installation according to claim 1, wherein the fuel-metering means are constructed as metering valve means whose through-flow cross section is regulatable and whose pressure drop is regulated by way of respectively coordinated pressure drop regulator means, the pressure regulator means of the metering valve means in the fuel line means to the burner means of the inner flow controlling the feed output of the first fuel pump means, the pressure-regulator means of the metering valve means in the fuel line means to the ignition burner means controlling the through-flow cross section of the throttle valve means in the fuel line means to the main burner means of the inner flow and the pressure regulator means of the metering valve means in the fuel line means to the burner means of the bypass flow controlling the feed output of the second fuel pump means.

12. An installation according to claim 1, wherein closure valve means are arranged in the fuel line means to the main burner means of the inner flow, to the ignition burner means and to the burner means of the bypass flow upstream of the respective burner means and individually controllable.

13. An installation according to claim 12, wherein a blow-out valve is coordinated to each of the closure valve means through which the sections of the fuel line means leading to the burner means downstream of the respective closure valve means are adapted to be individually connected with a blow-out device after closing of the closure valve means.

14. An installation according to claim 12, wherein the closure valve means are constructed as open/closed valves.

15. An installation according to claim 12, wherein at least one of the closure valve means in the fuel line means to the main burner means of the inner flow and the closure valve means in the fuel line means to the burner means of the bypass flow is constructed as sequence valve means for the sequential turning on or turning off of individual burner nozzle groups of the coordinated burner means.

16. An installation according to claim 13, wherein a pressure build-up valve is arranged in the fuel line means to the ignition burner means downstream of the metering valve means thereof.

17. An installation according to claim 13, wherein the prefill shifting valve means is actuated fuel-hydraulically in dependence on system internal pressures and is operable to be hydraulically locked in the closed position.

18. An installation according to claim 1, wherein the pre-fill shifting valve means is controlled by electronic control means.

* * * * *